United States Patent
Budd et al.

(10) Patent No.: US 8,289,231 B2
(45) Date of Patent: Oct. 16, 2012

(54) COMPACT OPTICAL SYSTEM AND PACKAGING FOR HEAD MOUNTED DISPLAY

(75) Inventors: Russell A. Budd, North Salem, NY (US); Derek B. Dove, Mount Kisco, NY (US); Istvan Lovas, Mahopac, NY (US); Robert S. Olyha, Jr., LaGrange, NY (US); Carl G. Powell, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 1887 days.

(21) Appl. No.: 10/764,638

(22) Filed: Jan. 26, 2004

(65) Prior Publication Data
US 2005/0219152 A1 Oct. 6, 2005

Related U.S. Application Data

(62) Division of application No. 09/626,749, filed on Jul. 27, 2000, now Pat. No. 6,747,611.

(51) Int. Cl.
*G09G 5/00* (2006.01)
(52) U.S. Cl. .................................. 345/8; 345/7
(58) Field of Classification Search .................. 345/7–9; 349/11; 359/51, 630; 351/114, 115
See application file for complete search history.

(56) References Cited

U.S. PATENT DOCUMENTS

| | | | |
|---|---|---|---|
| 4,260,218 A | 4/1981 | Gullicksen et al. | |
| 5,347,400 A | * | 9/1994 | Hunter ........................... 359/815 |
| 5,485,172 A | * | 1/1996 | Sawachika et al. ............... 345/8 |
| 5,757,339 A | | 5/1998 | Williams et al. |
| 5,771,124 A | | 6/1998 | Kintz et al. |

(Continued)

FOREIGN PATENT DOCUMENTS

EP 0 825 470 A1 2/1998

(Continued)

OTHER PUBLICATIONS

Wired for Wear: IBM Researches Demonstrate a Wearable ThinkPad Prototype, http://www.ibm.com/news/ls/1998/09/jp_3.phtml, 1 page, 1998.

(Continued)

*Primary Examiner* — Srilakshmi K Kumar
(74) *Attorney, Agent, or Firm* — Daniel P. Morris; Ryan, Mason & Lewis, LLP

(57) ABSTRACT

A head mounted virtual image display unit is provided which is compact in size and weight, and incorporates a high performance optical system offering a clear see-through capability. A sliding light shield may be incorporated for those instances when see-through capability is not desired. A focus adjustment may be incorporated to permit the focusing of the image, for example, at a distance of approximately 18 inches to infinity. An adjustable headband may be incorporated that adapts to fit the users head. A flexible boom structure may be incorporated to facilitate fine positional adjustment of the optical assembly. A slider and ball joint mechanism may also be incorporated to facilitate positional adjustment of the optical assembly. A built-in microphone may be incorporated to enable speech input by the user. The head mounted virtual image display unit may be used comfortably in conjunction with eye or safety glasses, and provides a useful image to the user without blocking his view of the surrounding environment. The unit is designed to have a pleasing appearance so as to greatly enhance user acceptability.

1 Claim, 11 Drawing Sheets

U.S. PATENT DOCUMENTS

| | | | |
|---|---|---|---|
| 5,844,530 A * | 12/1998 | Tosaki ............................... | 345/8 |
| 5,844,656 A | 12/1998 | Ronzani et al. | |
| 5,903,395 A * | 5/1999 | Rallison et al. ................ | 359/630 |
| 5,970,418 A * | 10/1999 | Budd et al. ..................... | 455/566 |
| 5,991,085 A * | 11/1999 | Rallison et al. ................ | 359/630 |
| 6,034,653 A * | 3/2000 | Robertson et al. ................ | 345/8 |
| 6,160,666 A * | 12/2000 | Rallison et al. ................ | 359/630 |
| 6,339,411 B2 * | 1/2002 | Miyazaki et al. ............... | 345/1.1 |
| 6,369,952 B1 * | 4/2002 | Rallison et al. ................ | 359/630 |
| 6,452,572 B1 * | 9/2002 | Fan et al. .......................... | 345/8 |
| 6,900,778 B1 * | 5/2005 | Yamamoto ....................... | 345/8 |

FOREIGN PATENT DOCUMENTS

| | | | |
|---|---|---|---|
| JP | 04-330370 | | 12/1994 |
| JP | 06/045700 | | 2/1995 |
| JP | 408248346 A | * | 9/1996 |
| JP | 409164256 A | * | 6/1997 |
| JP | 411295638 A | * | 10/1999 |
| JP | 10-136296 | | 11/1999 |
| JP | 10-178870 | | 1/2000 |

OTHER PUBLICATIONS

See the Specifications for IBM's New Wearable PC Prototype, http://www.ibm.com/news/ls/1998/09/jp_4.phtml, 1 page, 1998.

* cited by examiner

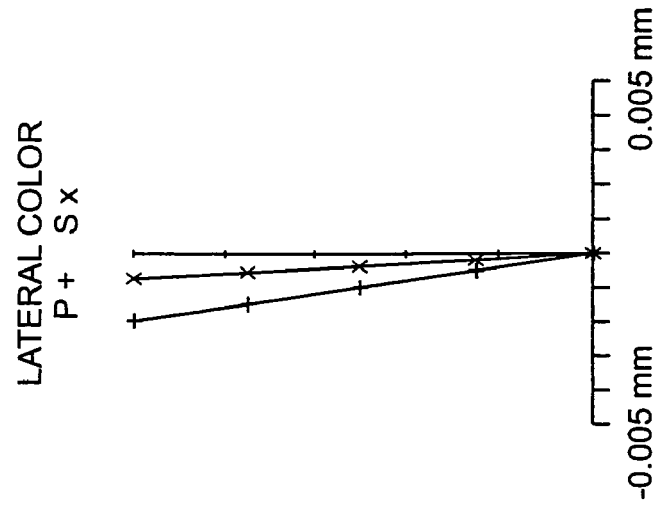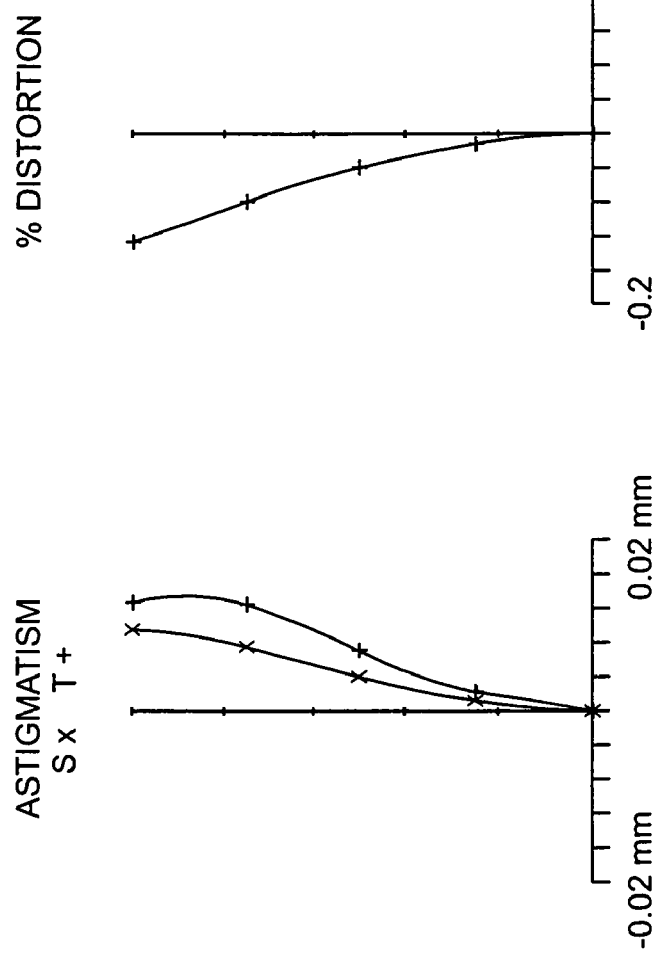

FIG. 7 LENS DATA

| | A<br>SRF | B<br>RADIUS | C<br>THICKNESS | D<br>APERTURE<br>RADIUS | E<br>GLASS<br>TYPE |
|---|---|---|---|---|---|
| | OBJ | -- | -1.0000e+23 | 1.4375e+22 | AIR |
| | AST | -- | -- | 3.000000 AS | AIR |
| | 2 | -- | 0.000100 | 3.000000 | BK7 |
| | 3 | -- | -- | 3.000000 | AIR |
| | 4 | -- | 25.000000 | 3.000000 | AIR |
| 1400 { | 5 | -- | 8.250000 | 8.250000 | BK7 |
| | 6 | -- | -- | 11.000000 | REFLECT |
| | 7 | -- | -8.250000 | 8.250000 | BK7 |
| 1500 { | 8 | -- | -2.000000 | 8.250000 | BK7 |
| | 9 | 78.000000 | -- | 8.250000 | REFLECT |
| | 10 | -- | 2.000000 | 10.000000 | BK7 |
| 1400 { | 11 | -- | 8.250000 | 8.250000 P | BK7 |
| | 12 | -- | 8.250000 | 7.124729 S | BK7 |
| | 13 | -- | -- | 6.140874 S | AIR |
| 1300 { | 14 | -- | 2.000000 | 6.140874 S | SF1 |
| | 15 | 42.500000 | -- | 7.000000 | AIR |
| | 16 | -- | -- | 5.930217 S | AIR |
| | 17 | -- | 9.793505 | 5.930217 S | AIR |
| 1200 { | 18 | 15.300000 | 2.250000 | 5.139002 S | BK7 |
| | 19 | -105.300000 | -- | 4.761667 S | AIR |
| | 20 | -- | 1.712715 | 4.761667 S | AIR |
| | 21 | -- | 1.000000 | 4.285971 S | AIR |
| 1100 { | 22 | -- | 0.900000 | 4.008228 S | BK7 |
| | 23 | -- | -- | 3.843427 S | BK7 |
| | 24 | -- | -- | 3.843427 S | AIR |
| | IMS | -- | -- | 3.843427 | |

COMPACT OPTICAL SYSTEM AND PACKAGING FOR HEAD MOUNTED DISPLAY

CROSS REFERENCE TO RELATED APPLICATION

This application is a divisional of U.S. application Ser. No. 09/626,749, filed Jul. 27, 2000, now U.S. Pat. No. 6,747,611, the disclosure of which is incorporated by reference herein.

FIELD OF THE INVENTION

The present invention relates generally to compact optical systems and, more particularly, to compact optical systems for use in display devices, for example, personal devices such as wearable personal computer systems, head mounted displays, portable telephones and the like.

BACKGROUND OF THE INVENTION

Virtual image displays combine magnifying optics with a small image panel to provide the viewer with a virtual image capable of displaying large amounts of information. Such displays have found application in so called head mounted displays and are used in conjunction with a computer-based device for a variety of applications. As is known, the computer-based device includes processing and display driver circuitry for generating the image signal to be displayed via the optics and image panel.

However, such conventional virtual image displays are known to have many shortcomings. For example, such displays have suffered from being too heavy for comfortable use, as well as too large so as to be obtrusive, distracting, and even disorienting. These defects stem from, among other things, the incorporation of relatively large optics systems within the mounting structures, as well as physical designs which fail to adequately take into account such important human factors as size, shape, weight, etc.

Examples of some conventional head mounted virtual displays are shown in FIGS. 1 and 2. FIG. 1 illustrates a head mounted virtual display unit 10 which rests on the users head and face in a manner similar to that of a pair of eye glasses. The user views virtual images through the display portion 12. Nose bridge 14 and side supports 16 serve to provide support for the display while on the users head and face. The unit 10 may be connected to a computer via connector 18. It is known that such a unit is cumbersome and permits the wearer to see substantially nothing other than the display screen. That is, the user is unable to view his immediate environment. Such a head mounted virtual display is disclosed in an international patent application identified as WO 95/11473, the disclosure of which is incorporated herein by reference.

FIG. 2 illustrates a head mounted monocular virtual display unit 20. The support structure 12 is positioned on a users head and the display portion 14 comes down in the users field of vision. This design is also known to be cumbersome and likely to obstruct the users surrounding view. Such a head mounted monocular virtual display is also disclosed in a the international patent application identified as WO 95/11473.

Other examples of conventional compact display systems and head mounted displays are disclosed in U.S. Pat. No. 5,771,124 to Kintz et al., U.S. Pat. No. 5,757,339 to Williams et al., and U.S. Pat. No. 5,844,656 to Ronzani et al., the disclosures of which are incorporated herein by reference. Still further, it is known that Sony Corporation makes a head mounted virtual display known as the "Glasstron."

However, all of the examples given suffer from one or more of the above-mentioned design deficiencies. As a result, such deficiencies have seriously hindered the general acceptance of such devices.

Compact optical systems for use in virtual display applications which improve upon the previously existing art are described in two U.S. patent applications assigned to the present assignee and identified as U.S. Ser. Nos. 09/437,972 and 09/437,793, both filed on Nov. 10, 1999, the disclosures of which are incorporated herein by reference.

Nonetheless, there is a need for a compact optical system for use in display devices, for example, personal devices such as wearable personal computers, head mounted displays, portable telephones and the like, which substantially reduces or eliminates the above-mentioned deficiencies as well as others not specifically mentioned associated with the existing art, and/or which improves upon the compact optical system designs described in the above-referenced U.S. patent applications identified as U.S. Ser. Nos. 09/437,972 and 09/437,793.

SUMMARY OF THE INVENTION

The present invention provides an optical system design for use in display devices such as, for example, a head mounted virtual image display, that remedies defects exhibited by conventional designs, e.g., prohibitive size and weight, obstructed view, etc. Such a novel design, for example, makes possible wearable computer systems of greater convenience and acceptability to a wide range of users.

In accordance with one embodiment of a compact optical system of the invention for directing an image signal for viewing by a user, wherein the image signal is generated in accordance with a microdisplay, the optical system comprises: a beam splitting prism positioned proximate to the microdisplay; a field lens positioned between the beam splitting prism and the microdisplay; a negative lens positioned between the field lens and the beam splitting prism; a reflective lens positioned proximate to the beam splitting prism, on a side of the beam splitting prism opposite the microdisplay; and a quarter wave plate positioned between the reflective lens and the beam splitting prism; wherein the beam splitting prism, the field lens, the negative lens, the reflective lens and the quarter wave plate are arranged such that the image signal, linearly polarized in accordance with the microdisplay: (a) passes through the field lens and the negative lens; (b) enters the beam splitting prism substantially passing through a polarizing surface of the beam splitting prism; (c) passes through the quarter wave plate becoming circularly polarized; (d) reflects at a surface of the reflective lens back toward the quarter wave plate passing through the quarter wave plate a second time becoming linearly polarized with a polarization direction rotated by 90 degrees with respect to an original linear polarization direction associated with the image signal; and (e) reenters the beam splitting prism substantially reflecting at the polarizing surface of the beam splitting prism and exits the beam splitting prism for viewing by the user.

In accordance with one embodiment of a head mounted virtual image display unit according to the invention, the display unit is compact in size and weight, and incorporates a high performance optical system, such as the optical system described above, offering a clear see-through capability. A sliding light shield may be incorporated for those instances when see-through capability is not desired. A focus adjustment may be incorporated to permit the focusing of the image, for example, at a distance of approximately 18 inches to infinity. An adjustable headband may be incorporated that adapts to fit the users head. A flexible boom structure may be incorporated to facilitate fine positional adjustment of the optical assembly. A slider and ball joint mechanism may also be incorporated to facilitate positional adjustment of the optical assembly. A built-in microphone may be incorporated to enable speech input by the user.

It is to be appreciated that the head mounted virtual image display unit may be used comfortably in conjunction with eye or safety glasses, and provides a useful image to the user without blocking his view of the surrounding environment. The unit is designed to have a pleasing appearance so as to greatly enhance user acceptability.

It is to be further appreciated that a head mounted virtual image display unit may be combined with a computer-based device. The computer-based device may generate and provide an electrical signal to a microdisplay associated with the display unit for use in generating the image signal to be viewed by the user. The combination advantageously forms a portable computer system.

These and other objects, features and advantages of the present invention will become apparent from the following detailed description of illustrative embodiments thereof, which is to be read in connection with the accompanying drawings.

BRIEF DESCRIPTION OF THE DRAWINGS

FIGS. 6A through 6C illustrate graphs highlighting performance of an optical system according to an embodiment of the present invention in terms of its astigmatism, distortion, and lateral color;

FIG. 7 illustrates a table of design parameters of an optical system according to an embodiment of the present invention;

DETAILED DESCRIPTION OF PREFERRED EMBODIMENTS

An optical system design of the present invention will be explained below in the context of a head mounted virtual image display unit and wearable computer. However, it is to be understood that the present invention is not limited to this or any particular display application. Rather, the invention is more generally applicable to any suitable display application in which it is desirable to utilize a compact optical system for displaying images which may be incorporated into a device used in the application. Such devices may be, for example, personal devices such as wearable personal computers, head mounted displays, portable telephones and the like.

Figure 1:
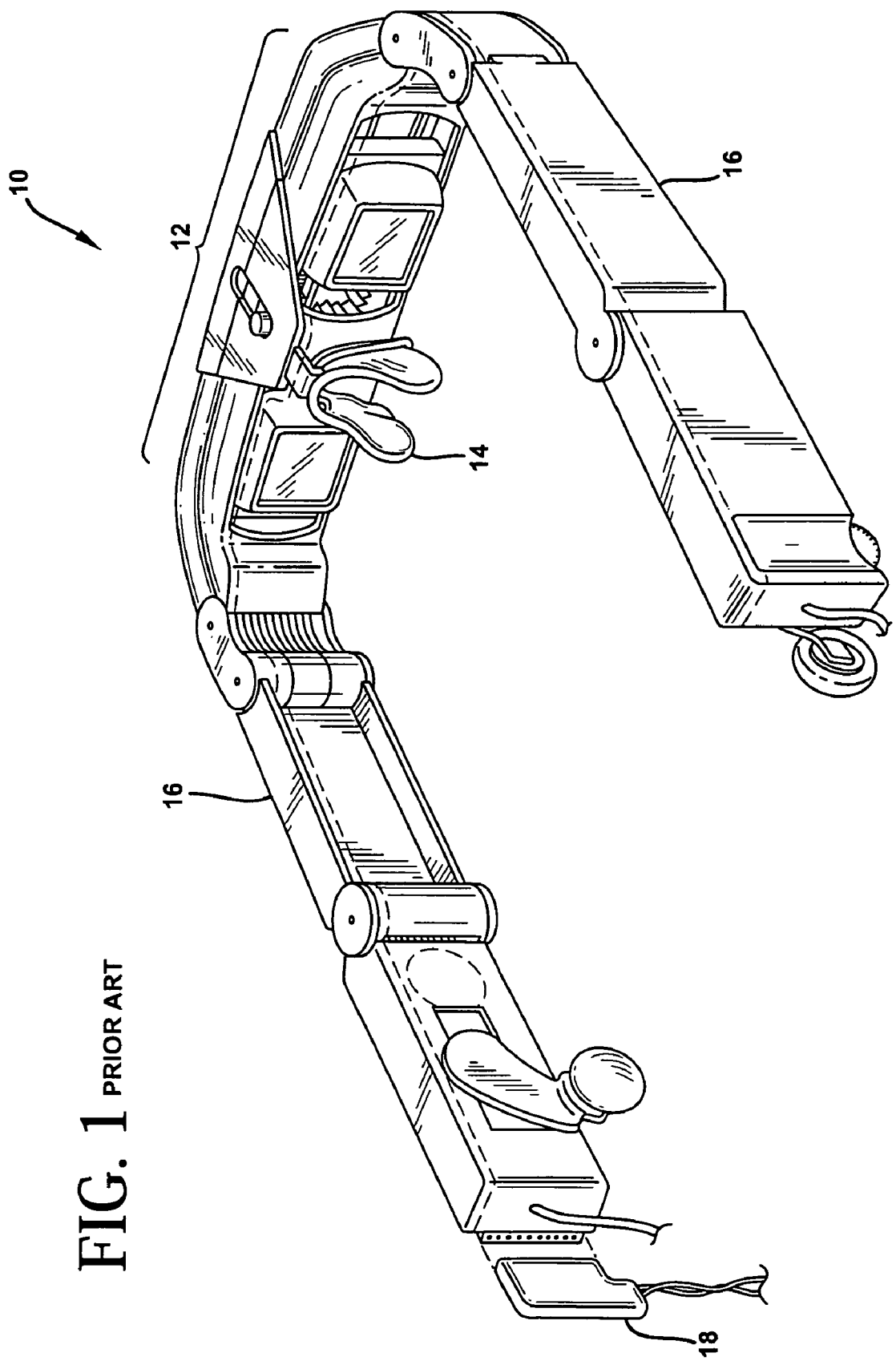
FIG. 1 illustrates a conventional eye glass type head mounted virtual display.
Figure 2:
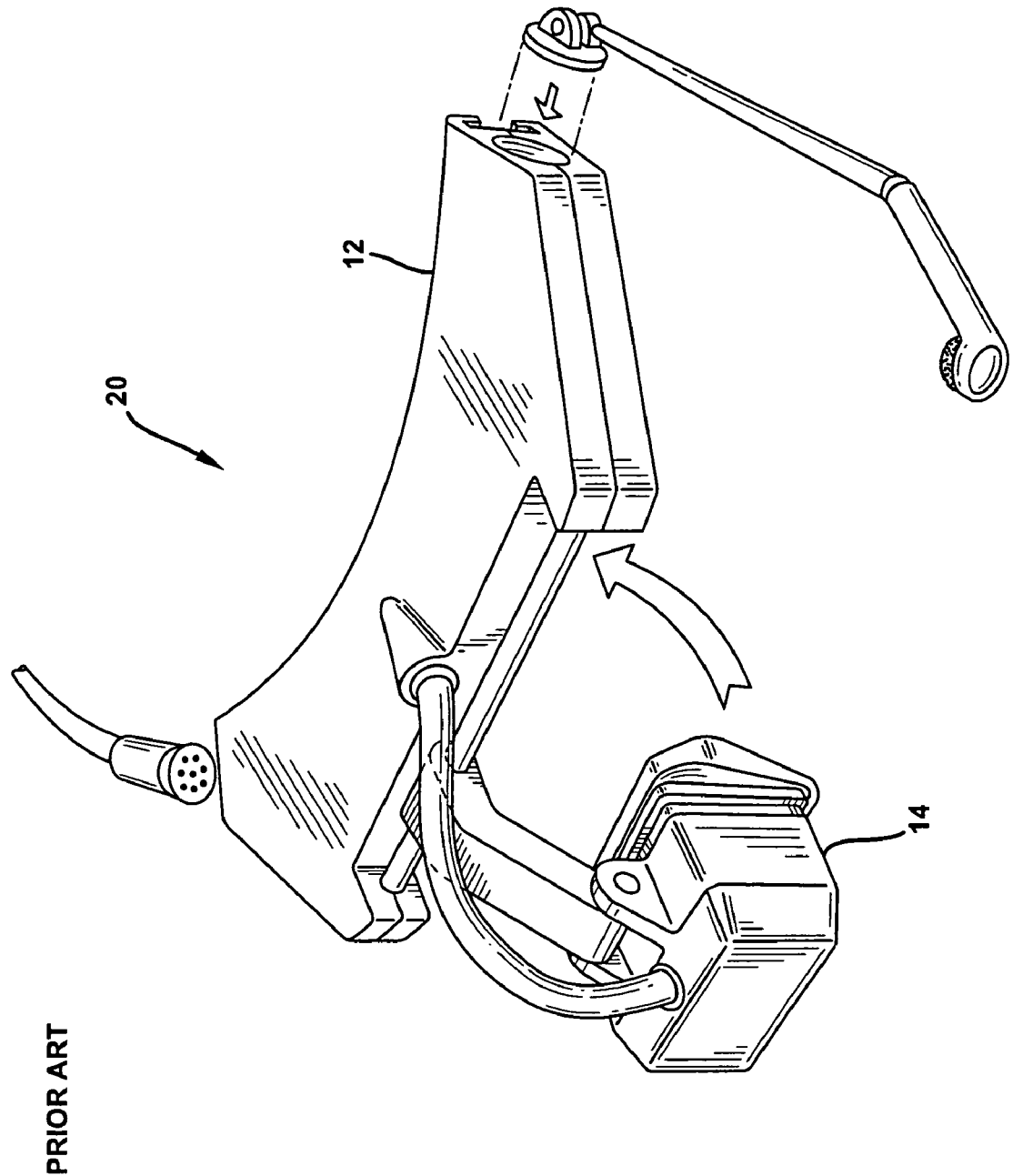
FIG. 2 illustrates a conventional monocular type head mounted virtual display.
Figure 3A:
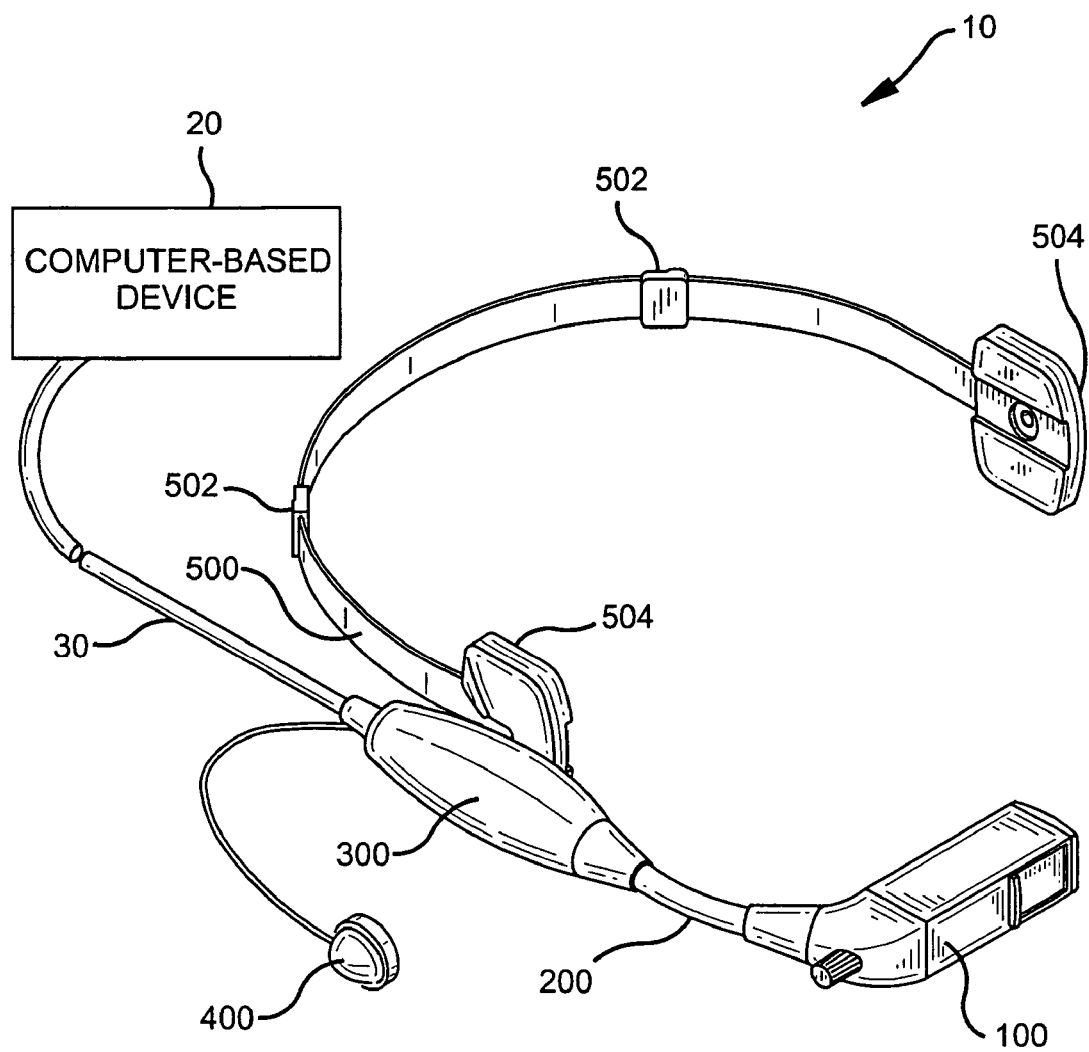
FIG. 3A illustrates a first view of a head mounted virtual display unit and computer-based device according to one embodiment of the present invention.
Figure 3B:
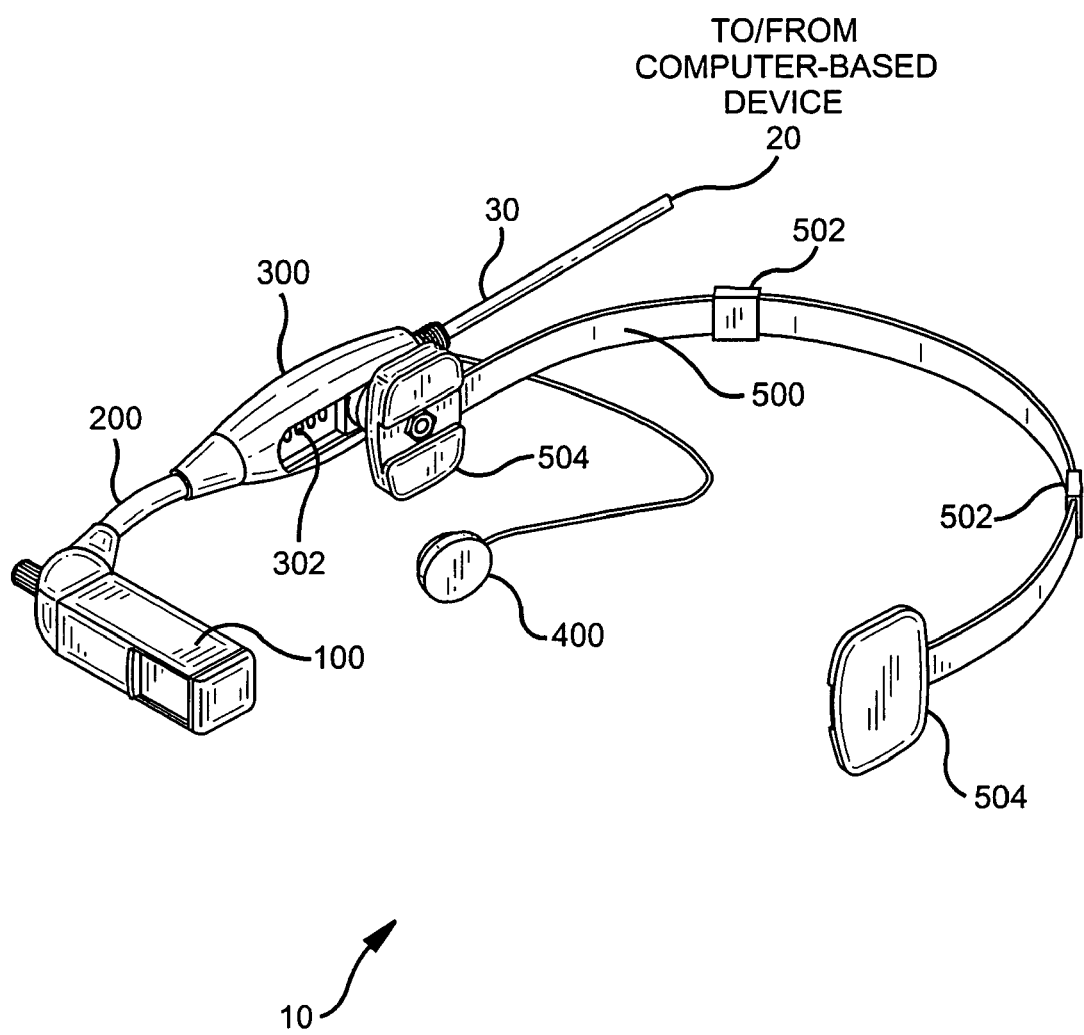
FIG. 3B illustrates a second view of a head mounted virtual display unit and computer-based device according to one embodiment of the present invention.

Referring initially to FIGS. 3A and 3B, a head mounted virtual display unit 10 and computer-based device 20 according to one embodiment of the present invention are shown. A cable 30 is provided for electrically coupling the computer-based device 20 with the head mounted virtual display unit 10. FIGS. 3A and 3B illustrate the same head mounted virtual display unit 10, but from opposing views. It is to be understood that the computer-based device 20 preferably has a small form factor, e.g., pocket-sized, and is lightweight. It may also preferably have a clip for attachment to a user's belt or pocket. Such a computer-based device is referred to as a "wearable computer." The wearable computer may include all or most of the typical components available in a personal computer, laptop computer, personal digital assistant or the like, e.g., a processor (e.g., CPU), fixed memory, removable memory, display driver circuitry, external network (e.g., Internet) connection device, application software, etc.

The head mounted virtual display unit 10 comprises: an optical module 100; a flexible boom 200; an adjustment pod 300; an earpiece 400; and a head band 500. According to a preferred embodiment of the invention, the optical module 100 comprises an optical system, a focus mechanism, a sliding light shield and an integrated microphone. The flexible boom 200 enables fine positional control of the optical module 100 in front of the user's eye. By way of example, a metal or plastic, spiral-wound gooseneck tubing may be used as the flexible boom. Such tubing is well known and commercially available. The adjustment pod 300 preferably contains a combination sliding and ball joint mechanism for controlling of the boom position and angle. This embodiment will be explained in more detail below in the context of FIG. 10. Of course, other arrangements for affecting positional control of the optical module may be employed. The earpiece 400 is shown attached to the pod 300 by means of a connecting wire. Alternatively, it may be attached to the pod 300 with its output directed towards the user's ear, or attached on a swing down lever from the pod 300. The headband 500 is shown with adjustment tabs 502 and head grips 504. The headband is normally worn around the back of the head, however, alternate arrangements are possible. For example, the band may go over the top of the head or, alternatively, the pod 300 may be attached to a helmet (not shown).

It is to be appreciated that the flexible boom 200 and adjustment pod 300 permit the user to move the optical module 100 into and out of the field of view of, in this case, his right eye. Of course, the unit 10 may be configured such that the optical module 100 is viewed by a wearer's left eye. In such case, the unit 10 can be turned over to be used by the left eye. Also, the unit 10 may be configured to include two separate display portions, that is, one for the right eye and one for the left eye. One or ordinary skill in the art will realize other configurations.

Thus, the combination of the display unit 10 and the computer-based device 20 permits a user to view visual data generated in accordance with the device 20, e.g., from application software, web browser, etc. The visual information is provided to the display via cable 30. The earpiece 400 permits a user to listen to audio data generated in accordance with the device 20. The microphone (shown in FIG. 8) in the optical module 100 permits a user to input voice commands to the computer.

Accordingly, FIGS. 3A and 3B illustrate a light weight wearable computer system comprising a light weight head mounted display unit containing a compact optical system used in conjunction with a pocket sized, wearable computer. Since the optical system is attached to the user's head by means of a light weight boom or band structure, such as shown, this enables a total head mounted display weight of approximately two ounces or less to be achieved.

Figure 4:
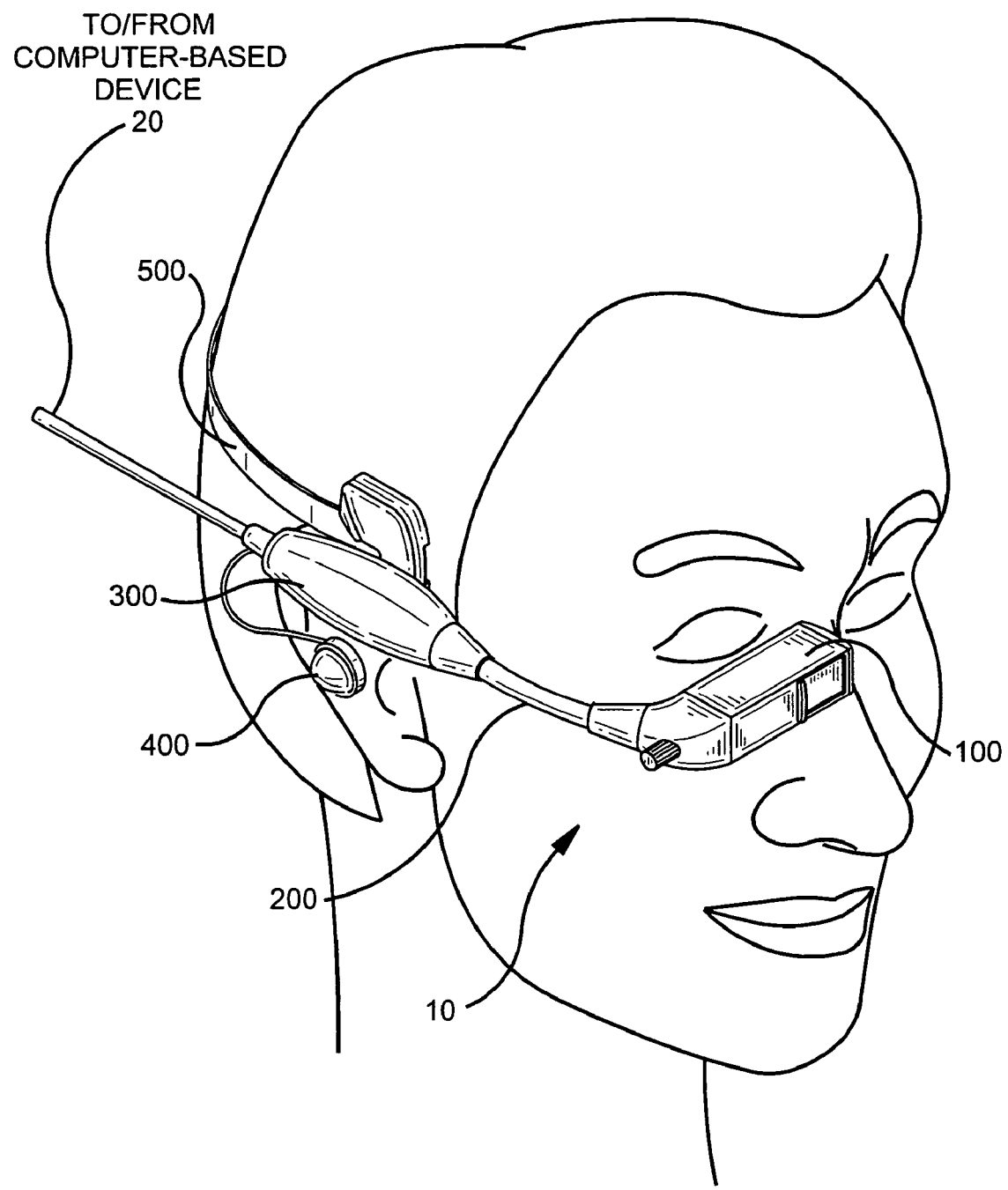
FIG. 4 illustrates an artistic rendering of a head mounted virtual display unit according to the present invention as may be worn by a user.

FIG. 4 illustrates an artistic rendering of a head mounted virtual display unit 10 according to the present invention as may be worn by a user. As shown, the optical module 100 may be advantageously moved into the field of view of the user's right eye or left eye. It is small so as to be unobtrusive and allows an undistorted view through the optical system to the outside world. When the display is turned on, there is enough light that the display can be seen clearly against the surroundings.

A preferred optical system according to the present invention for use in the optical module 100 will now be described. It is to be understood, however, that the inventive optical system design may be used in accordance with devices other than the wearable computer system illustrated in FIGS. 3A and 3B. Given their compact form factors and ability to display high quality optical images, the optical system of the invention is suitable for a vast number of applications. One of ordinary skill in the art will realize various other implementations and applications with which such an inventive optical system may be employed.

Further, as will be explained in detail in connection with the following embodiment, the optical system of the invention provides optics with folded light paths which are "on-axis" optics rather than "free form" optics. In this manner, the optical system is able to provide the advantages and features described herein, as well as others that one or ordinary skill in the art will realize given the inventive teachings herein. It is to be appreciated that by the terms "on-axis" and "free form," we mean the following. A ray going through a typical spherical lens that is normal to the lens and passes through its center, defines the optical axis. The bundle of rays passes through the lens cluster about this axis and may be well imaged by the lens. Examples of systems might be a camera, microscope, or binoculars. In more complex systems, the bundle of rays may cluster about a line tilted with respect to the lens; this would be "off-axis" imaging. Note, the typical spherical lens is symmetric about the optic axis. Yet other systems are not radially symmetric and do not have a clear optical axis as defined above, yet may still perform an imaging function. We generally call them "free form" optics.

Figure 5:
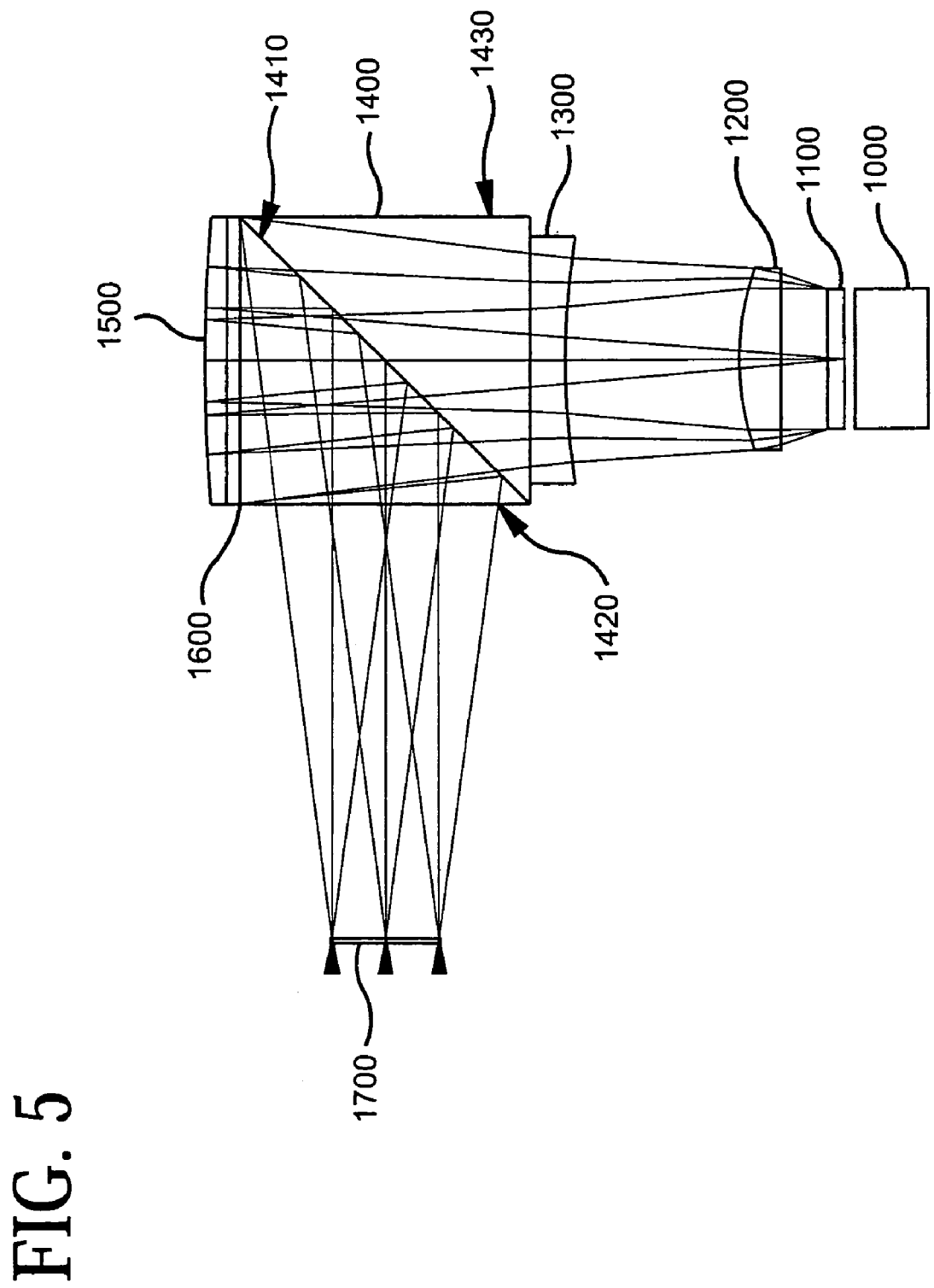
FIG. 5 illustrates a virtual display optical system according to an embodiment of the present invention.

Referring now to FIG. 5, a virtual display optical system according to an embodiment of the present invention is shown. As previously mentioned, this optical system is preferably the optical system that is employed in the optical module 100. Light from a light source 1000, typically a cluster of red, green and blue light emitting diodes (LEDs), illuminates a microdisplay 1100. In this embodiment, the microdisplay is a transmissive type microdisplay. Transmissive microdisplays that may be used in accordance with the invention are available, for example, from Kopin of Taunton, Mass. It is to be appreciated that the transmissive microdisplay may be replaced with an emissive microdisplay wherein the light source is internal to the microdisplay. Emissive microdisplays that may be used in accordance with the invention are available, for example, from Planar of Beaverton, Oreg. Also, the microdisplay may be a reflective type microdisplay. Reflective microdisplays that may be used in accordance with the invention are available, for example, from Colorado Microdisplay of Boulder, Colo.

In any case, as is well known, the microdisplay creates an image in response to electrical signals applied to the display. The electrical signals may, for example, be provided to the microdisplay from the computer-based device 20 (FIGS. 3A and 3B). This image is viewed by means of a field lens 1200, a negative lens 1300, a beam splitting prism 1400, a quarter wave plate 1600 and a reflective lens 1500. As is well known, a negative lens includes one or more outer surfaces having a concave form, as compared to a positive lens which includes one or more outer surfaces having a convex form. Light from the display is linearly polarized and travels through lenses 1200 and 1300 entering the prism 1400. The polarization of the light is such that the light is substantially transmitted through a polarizing surface 1410 of prism 1400. The light then passes through the quarter wave plate 1600 and becomes circularly polarized. The reflective lens 1500 has a reflective coating (e.g., metallic or dielectric reflective material) at its curved surface that reflects light back towards the quarter wave plate 1600. Upon passing through the quarter wave plate 1600 a second time, the light once again becomes linearly polarized, however, its polarization direction has now been rotated by 90 degrees. The light reenters the prism 1400 and is now substantially reflected by polarizing surface 1410. The light leaves the prism 1400 and approaches the exit pupil 1700 of the optical system. The optical system exit pupil 1700 is where the user normally positions their eye to view the virtual image of the microdisplay 1100.

It is a feature of this design that the eye, in looking through the optical system to the outside world, does not see a distorted view. This is achieved by a design feature of the invention whereby the shapes of the entry surface 1420 and exit surface 1430 of prism 1400 are designed to be of substantially the same shape or form for this purpose.

It is also a feature of this optical system that the light from the microdisplay 1100 forms a virtual image at the exit pupil 1700, and that the image is of high quality and substantially free of aberration. That is, the virtual image is essentially free of astigmatism, essentially free of lateral distortion, and essentially free of lateral color aberration.

This high performance is achieved by combining the field lens 1200, the negative lens 1300, the prism 1400, the quarter wave plate 1600 and the reflective lens 1500 in the arrangement shown and by proper selection of materials for these elements. In particular, the negative lens 1300 material is chosen to work in combination with the field lens 1200 and reflective lens 1500 to essentially eliminate lateral color aberration. The preferred design parameters associated with these lens, as well as the other elements of the optical module, will be given below in the context of FIG. 7.

FIGS. 6A through 6C show three respective graphs of the optical system performance of the optics shown in FIG. 5. In FIG. 6A, a graph of astigmatism versus field position is shown. It is apparent that image field is flat within 0.016 millimeters (mm), and that there is less than 0.005 mm of astigmatism between the sagital and tan gential directions. This means the image is essentially perfectly flat and essentially without astigmatism. FIG. 6B shows a graph of distortion versus field position. From this graph, we see that the optical system has less than 0.2 percent distortion across the field. For those skilled in the art, this means the image is essentially distortion free. FIG. 6C shows a graph of the lateral color versus field position. We see that at the maximum field position there is less than 0.003 mm difference in position between red, green, and blue colors. The microdisplay of a preferred embodiment has a pixel pitch of approximately 0.012 mm. Therefore, the optical system is essentially free of lateral color aberration.

FIG. 7 illustrates a table of design parameters of an optical system according to a preferred embodiment of the present invention. The table gives the surface number (column A), the surface radius or curvature (column B), the center thickness of surface (column C), the aperture radius of surface (column D) and the material (column E) for each optical element in the system. In the table, SRF refers to "surface;" OBJ refers to "object position;" AST refers to "aperture stop;" IMS refers to "image surface;" and BK7 and SF1 are industry standard glass types. It also gives the spacing between the elements. It is to be appreciated that the surfaces listed in the table (by surface number in column A) are surfaces of the components (e.g., beam splitting prism, field lens, etc.) of the optical system shown in FIG. 5. The correspondence between the components of FIG. 5 and the surfaces is denoted down the left hand side of FIG. 7 by the bracket and corresponding reference numeral of the component from FIG. 5. With this design data, one skilled in the art would be able to implement and verify the aforementioned performance of the optical system.

Figure 8:
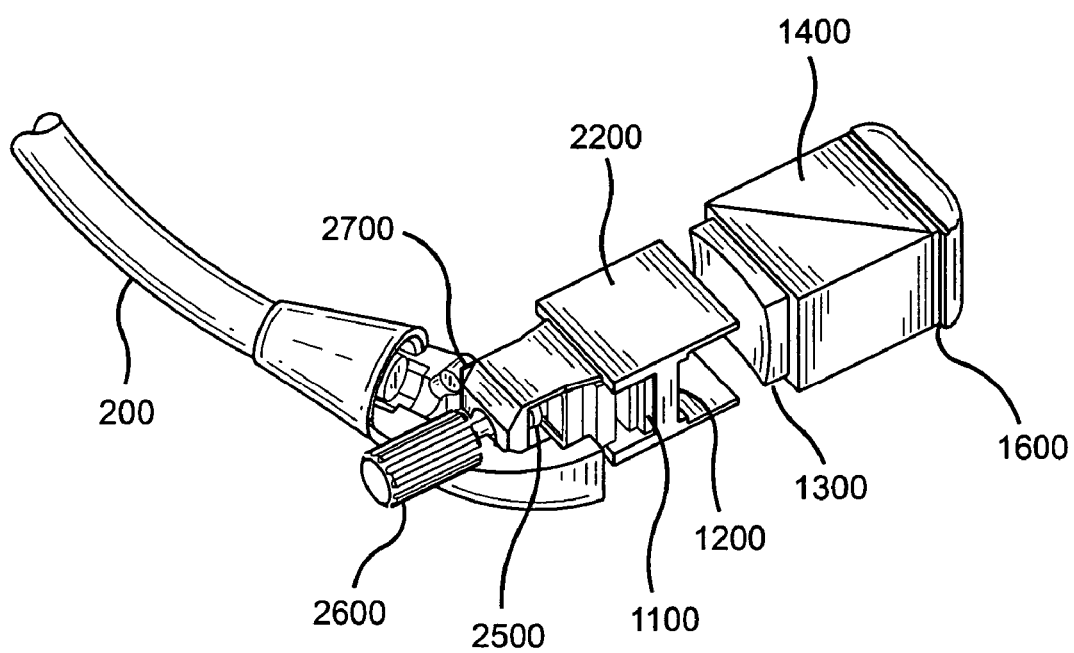
FIG. 8 illustrates an integrated focus mechanism and placement of a microphone in a head mounted virtual display according to an embodiment of the present invention.

Referring now to FIG. 8, an integrated focus mechanism and placement of an integrated microphone in a head mounted virtual display according to an embodiment of the present invention is shown. As previously mentioned, these components are housed in the optical module 100 shown in FIGS. 3A and 3B. It is to be understood that FIG. 8 illustrates the focus mechanism and microphone with the outer casing (housing) of the optical module 100 removed. With respect to the integrated focus feature, a compact carriage mechanism translates the field lens 1200, microdisplay 1100 and LED backlight 1000, shown in FIG. 5, such as to focus the virtual image at a distance of approximately 18 inches to infinity. The field lens 1200, the microdisplay 1100 and the backlight 1000 are mounted in the movable carriage 2200. The carriage 2200 is translated along the optical axis by means of a screw 2500 and knob 2600. Other conventional translation actuators arrangements may be employed. A motion of ±1 mm of the carriage 2200 relative to the beam splitting prism 1400 is sufficient to adjust the image focus over the desired range. It is to be appreciated that the negative lens 1300, the beam splitting prism 1400, the quarter wave plate 1600 and the reflective lens 1500 (located under the endcap of module housing and thus not visible in FIG. 8) remain fixed inside the housing of the optical module.

Also, FIG. 8 illustrates the placement of a compact microphone 2700. The microphone may be of the directional type. It is pointed towards the users face and away from the surrounding environment such as to pick up the voice of the user. It is to be appreciated that wiring for the microphone and for the optical system may be run through the flexible boom 200. As previously mentioned, the components in the optical module, as well as the earpiece 400 may be coupled to a computer-based device 20 via a cable 30 (FIGS. 3A and 3B).

Figure 9A:
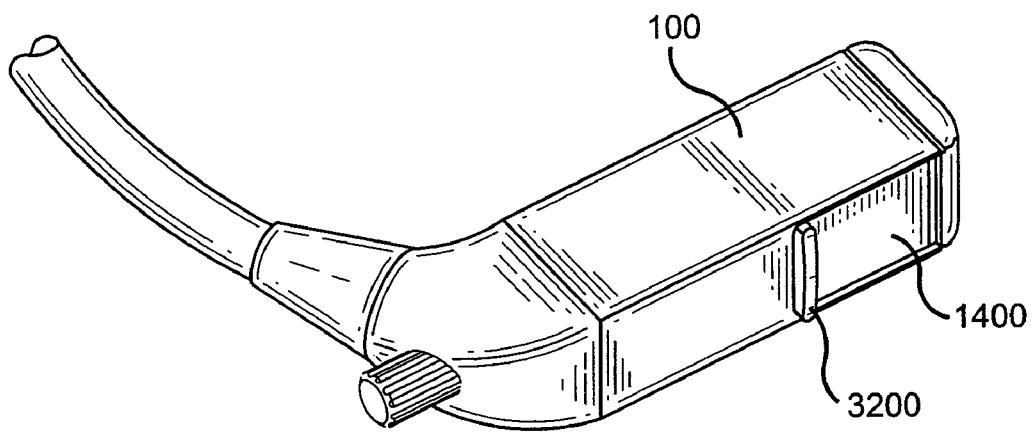
FIGS. 9A and 9B illustrate a sliding light shield in the open and closed positions, respectively, on a head mounted virtual display according to an embodiment of the present invention.
Figure 9B:
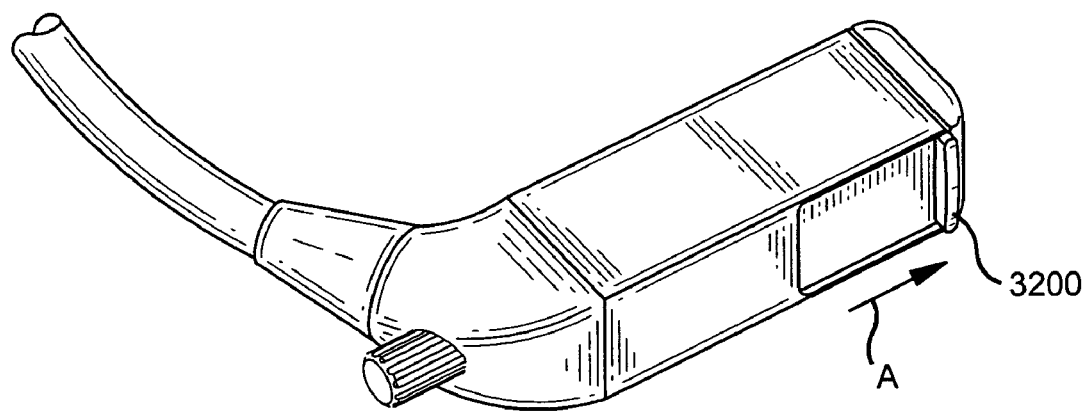

FIGS. 9A and 9B illustrate a sliding light shield in the open and closed positions, respectively, on a head mounted virtual image display according to an embodiment of the present invention. In particular, FIGS. 9A and 9B show a detailed view of the optical module 100 with a light shield integrated with the housing of the optical module. In FIG. 9A, a light shield 3200 is shown in the open position (see-through mode). Thus, a user viewing an image through the optics of the optical module 100 is able to see light emanating from behind the optical module 100. As shown, the beam splitting prism 1400 is visible in FIG. 9A with the light shield 3200 in the open position. In FIG. 9B, the light shield 3200 is shown in the closed position, thus blocking or substantially blocking the background light. The light shield 3200 may be slid by the user along the direction indicated by arrow A when it is desired to reduce or eliminate the background light. It is to be appreciated that the external light modifying shield may be opaque, partially opaque, colored or polarizing as desired by the application being executed in accordance with the virtual display system.

Figure 10:
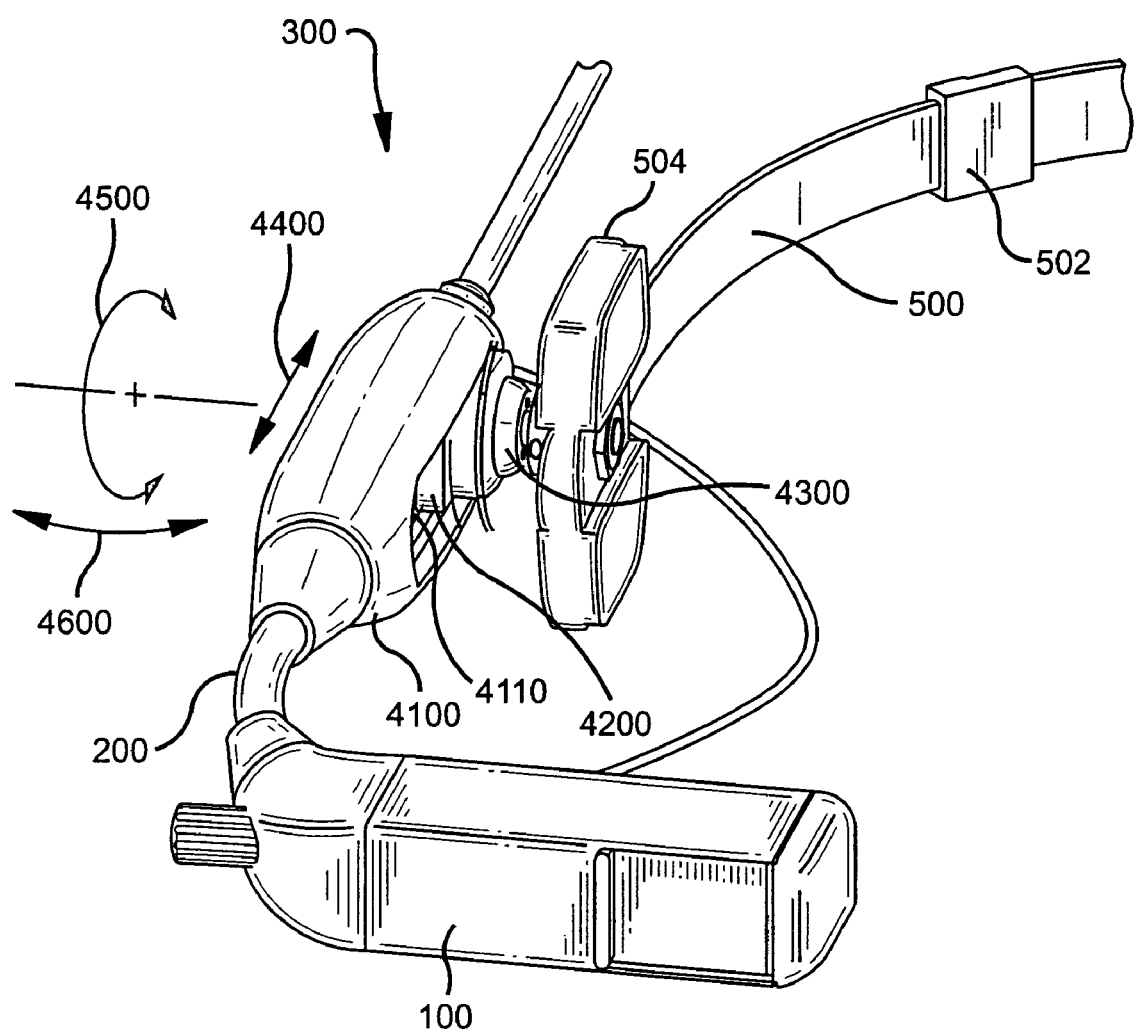
FIG. 10 illustrates headband and pod/boom adjustment mechanisms on a head mounted virtual display according to an embodiment of the present invention.

FIG. 10 illustrates headband and pod/boom adjustment mechanisms on a head mounted virtual display according to an embodiment of the present invention. Specifically, FIG. 10 shows a detail of the pod/boom adjustment mechanism. As shown, the adjustment pod 300 comprises a base portion 4100 having a channel 4110 formed therein. Inside the channel 4110 is fitted a slider mechanism 4200 which is capable of sliding back and forth the length of the channel, as denoted by the direction arrow 4400. Small circular indentations 302 (visible in FIG. 3B) mate with one or more corresponding protrusions on the inner side of the slider mechanism (not shown) to allow the slider mechanism, and thus the optical module 100, to remain in a desired position.

Further the pod assembly comprises a ball joint 4300 pivotably fitted in the slider mechanism 4200. The pivotable ball joint 4300 allows the pod assembly, and thus the optical module 100, to rotate, as denoted by the direction arrows 4500 and 4600. The flexible boom 200 also allows the optical module to be moved in any of the directions denoted by arrows 4400, 4500 and 4600. By incorporating the slider and ball joint mechanism and flexible boom, the user may adjust the optical module 100 to any particular distance and/or position he so desires, with respect to his eye, in an optimal manner.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A compact head mounted virtual image display unit, the unit comprising:
   a microdisplay;
   an optical system for directing an image signal for viewing by a user, the image signal being generated in accordance with the microdisplay;
   an optical system mounting structure for supporting the optical system within the field of view of only a single eye of the user;
   a housing to substantially contain at least the optical system; and
   a slidable opaque light shield, integrated within the housing and having an open position and a closed position, wherein the opaque light shield is slidable along a length of an exterior wall of the housing and slidably positioned with respect to the optical system such that, in the open position, the image signal is viewed by the user together with background light entering the optical system, and in the closed position, the image signal is viewed by the user with background light blocked from entering the optical system and thereby eliminated.

* * * * *